United States Patent Office 3,414,545
Patented Dec. 3, 1968

3,414,545
FULLY CONJUGATED AROMATIC
POLYMERS
Hartwig C. Bach., Durham, N.C., assignor to Monsanto
Company, St. Louis, Mo., a corporation of Delaware
No Drawing. Filed Sept. 3, 1964, Ser. No. 394,330
10 Claims. (Cl. 260—78)

ABSTRACT OF THE DISCLOSURE

Fully conjugated, heat resistant aromatic polymers having particular utility as semiconductors are prepared by oxidative coupling of a monomer containing glycyl methylene groups. The formation of polymer is by carbon-carbon double bond formation through the carbon atoms of the methylene groups.

This invention relates to new aromatic polymers and more particularly, the invention relates to fully conjugated aromatic polymers prepared by an oxidative coupling process.

The reaction involving the formation of carbon-carbon bonds by oxidation of activated methylene groups is a well known reaction which has been applied to the synthesis of indigo dyes. The concept of the fully conjugated bond system of indigo has now been applied in polymer chemistry to prepare fully conjugated aromatic polymers.

Accordingly, it is an object of this invention to provide new compositions of matter and a process for their preparation.

Another object of the invention is to provide fully conjugated aromatic polymers prepared by the formation of carbon-carbon bonds.

Another object of the invention is to provide a novel process for the preparation of high molecular weight fully conjugated aromatic polymers which involves the formation of carbon-carbon bonds by oxidation of activated methylene groups.

Still another object of the invention is to provide a new class of polymers which are especially useful in high thermal resistance and semi-conductivity applications.

These and other objects of the invention are generally accomplished by the preparation and provision of new compositions of matter which are referred to as fully conjugated aromatic polymers having the general formula

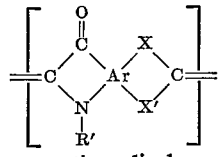

wherein Ar is an aromatic radical containing from 6 up to 18 or more carbon atoms, X and X' are selected from

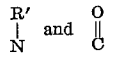

provided that both X and X' cannot be the same, and R' is a non-reactive substituent which may be hydrogen, lower alkyl, aryl or alkaryl.

Where R' is hydrogen it is possible to modify the polymers of the invention by further condensation reaction such as acrylation.

The aromatic radicals represented by Ar may be, for example, tetravalent benzene, naphthalene, biphenyl or substituted derivatives thereof. As examples of the polymers of this invention the following are typical and illustrative.

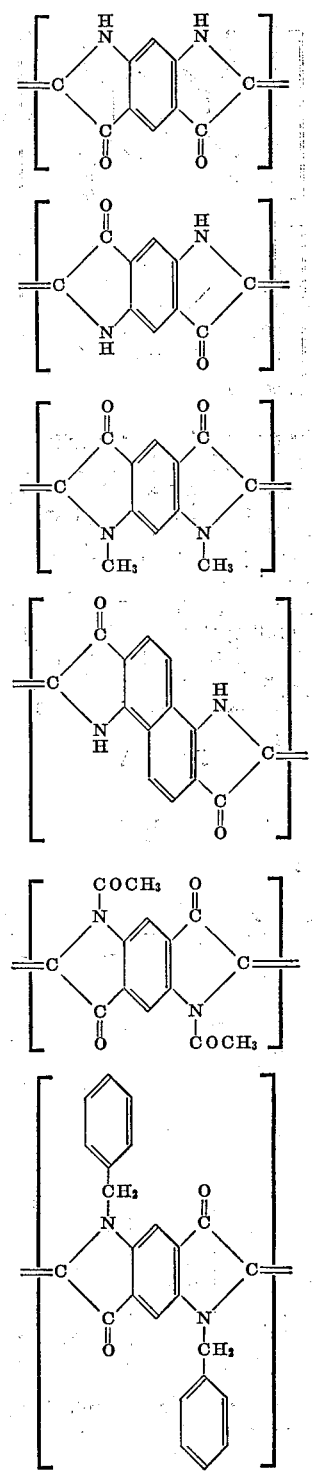

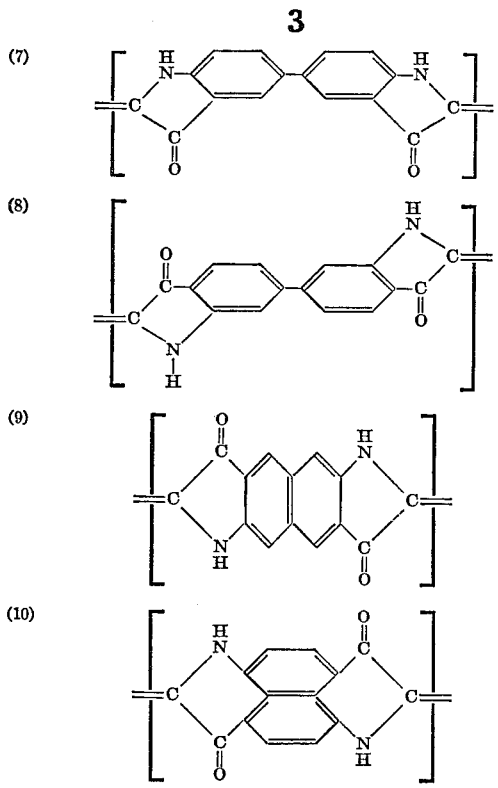

In general the preparation of the fully conjugated aromatic polymers of this invention involves the preparation of an intermediate monomer and its conversion to an oxidizable monomer containing glycyl methylene groups (—CO—CH$_2$—NR—), and then the oxidative coupling polymerization step is applied to the oxidizable monomer causing the formation of polymer via carbon-carbon double bond formation through the C atoms of the methylene groups. The overall synthesis of intermediates and polymers involves several routes, two of which are depicted as routes A and B for the preparation of the oxidizable monomers and the subsequent conversion to polymers as follows:

Route A

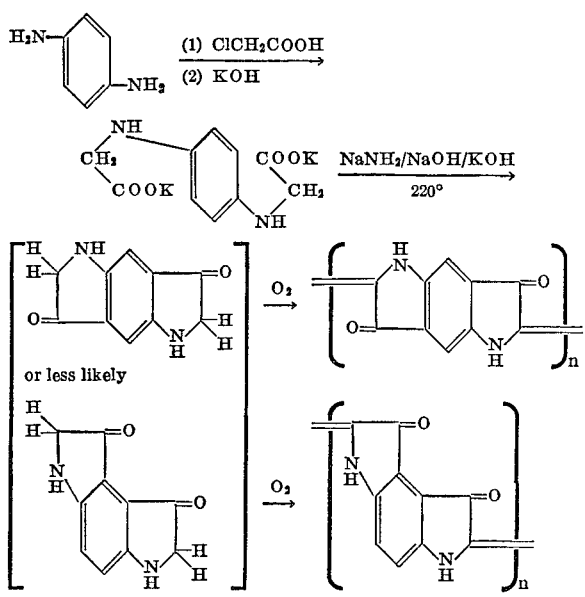

This reaction sequence is easily applied to m-phenylenediamine, 1,5-naphthalenediamine, benzidine and other diamines.

Route B

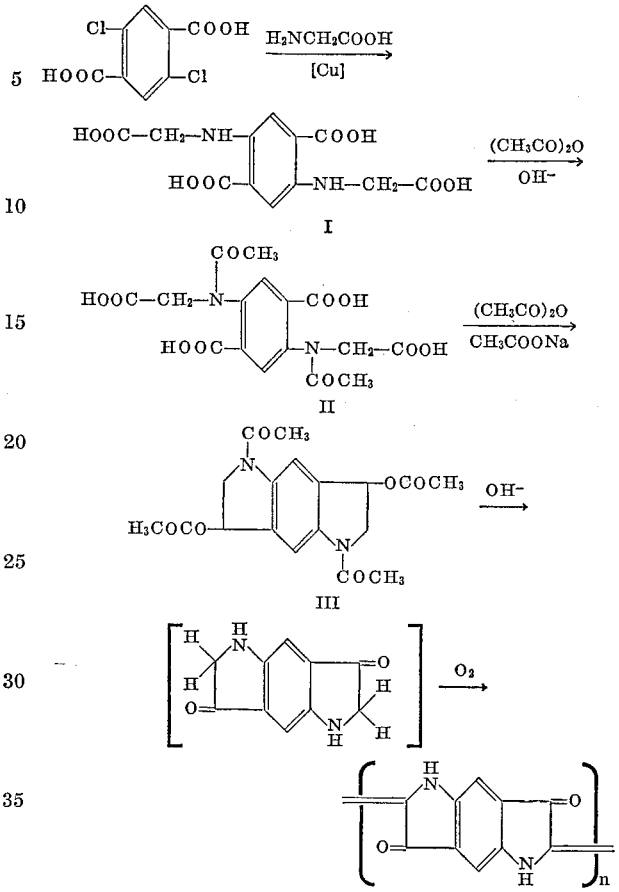

It is also possible and preferred to react I directly with the acetic anhydride/sodium acetate to produce III as shown by Example III.

This reaction sequence, although depicted here for a para-diacid or para-diamine starting compound, is equally applicable to other aromatic diacids and diamines. As it may be seen from the previous reaction steps, the intermediate monomer, regardless of whether Route A or B is used, will consist predominantely of compounds that may be depicted as having the following general formula

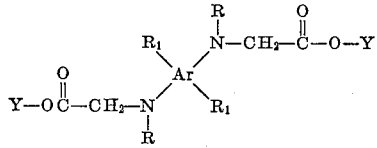

wherein Ar is an aromatic tetravalent radical containing from 6 up to 18 or more carbon atoms such as those derived from benzene, naphthalene, and biphenyl, R is hydrogen, lower alkyl, aryl, alkaryl or acyl, R$_1$ is hydrogen or carboxyl, and Y is hydrogen or a carboxylic acid salt forming substance such as sodium, potassium, lithium, calcium or magnesium. For example, this intermediate may be reacted as shown via Route A or B causing ring closure formation to occur to produce an oxidizable monomer

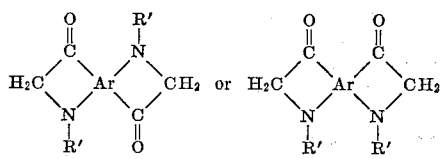

wherein Ar has the significance noted previously, and R' is selected from hydrogen, lower alkyl, aryl or alkaryl, and wherein each bivalent glycyl methylene radical is attached to the Ar nucleus so that the N and CO of each radical are fixed to adjacent substitutable carbon atoms of the Ar nucleus.

The preparation of the oxidizable monomer by ring closure Route A may be termed a sodium amide fusion in molten sodium and potassium hydroxide. This reaction is usually conducted at temperatures of from about 200° C. to about 300° C. Hydroxides or oxides formed from atoms of Groups IA and IIA of the Mendeleeff Periodic Table are suitable. In all cases the hydroxide, oxide or mixtures thereof must be in the molten state.

In Route B, an acid anhydride and an acid salt are used. This route is preferred when $R_1$ is carboxyl. Suitable acid anhydride-salt combinations are acetic anhydride and sodium acetate and others of the fatty acid group through 12 carbon acids.

The oxidizable monomer is induced to undergo the oxidative coupling reaction by being subjected to the action of air, molecular oxygen, or any other oxidizing agents such as peroxy compounds, particularly hydrogen peroxide, and the like, in the presence of a basic medium at room temperature until the polymerization reaction is substantially complete and the product is isolated by changing the medium from basic to acidic.

The amount of oxidant employed in order to obtain the highest yield of desired product should be no more than the theoretically predicted amount. Using a large excess of oxidant leads to decoloration of the mixture and no polymer. Optimum conditions for oxidation are a buffered, slightly basic medium.

The reaction medium for the second intermediate step involves the removal of all air from the reaction medium and then the controlled introduction of oxidant into the reaction mixture which has been rendered basic by the addition of a suitable base such as sodium hydroxide. Impurities are not detrimental to the achievement of high molecular weight polymer in general. This is due to the fact that only compounds having a glycyl methylene group can enter the oxidative coupling reaction, which yields the polymer.

The only compound which definitely has to be removed from the reaction medium is one resulting from a single instead of a double ring-closure. Such single closure compounds act as chain terminators. They are eliminated by treatment of the reaction medium with a base, such as sodium bicarbonate, which is strong enough to dissolve the undesirable compounds as the carboxylate salt but not strong enough to hydrolyze the second intermediate monomer.

Due to the nature of the intermediate monomer reaction the polymers of the invention may be considered to consist of a mixture of two types of polymers with respect to the positioning of the nitrogen and carbon atoms attached to Ar. Where both glycyl methylene groups close to form a ring in opposite directions the oxidizable monomer will have this structure

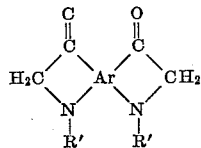

wherein R' and Ar have the significance noted previously. In those instances where the glycyl methylene groups close in the same direction the oxidizable monomer will have this structure

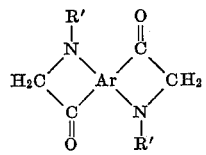

with R' and Ar as above. For reasons of steric hinderance and reactivity differences generally monomer of one of the structures shown will be predominately obtained. Route B is preferred since it reduces the possibility of mixtures of both types and produces predominately polymer of one type depending on the structure of the starting compounds.

The polymers of this invention have utility in a wide range of applications. They show extremely high resistance to all forms of thermal degradation with some polymer forms retaining their characteristics up to 900° C. Thermogravimetric analysis in nitrogen shows a weight loss of only around 22 percent for certain of the polymeric compositions of this invention upon heating from room temperature to a temperature of around 900° C. at a rate of 4° C. per minute which is substantially greater than any reported previously. Electrical resistivities of $1.1 \times 10^{10}$ (ohms centimeter) at 25° and $1.4 \times 10^{11}$ (ohms centimeter) at 27° were recorded, placing the polymers in the semi-conductor range ($10^{-3}$—$10^{12}$ ohms centimeter).

The invention is further illustrated by the following examples in which all parts and percents are by weight unless otherwise indicated.

EXAMPLE I

A solution of 4.7 g. of 2,5-dichloroterephthalic acid, 5.0 g. of glycine, 5.0 g. of KOH, 5.0 g. of $K_2CO_3$, 0.13 g. of copper powder in 80 ml. $H_2O$ was refluxed under a nitrogen blanket for 4 hours. The solution was filtered and cooled in an ice bath, 200 ml. of $H_2O$ added, and the product precipitated by acidification with conc. HCl. A 4.5 g. yield of red compound having a M.P. of 274–276° C. was obtained. Infrared analysis indicated that the compound was N,N'-(2,5-dicarboxy-p-phenylene) diglycine having the structural formula

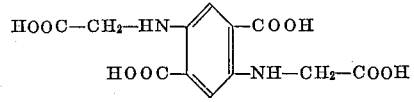

EXAMPLE II

A 6.2 gram portion of acetic anhydride was added over a 15 minute period at room temperature to a solution of 3.1 grams of N,N'-(2,5-dicarboxy-p-phenylene) diglycine and 5.4 grams of NaOH in 50 ml. $H_2O$. After ½ hour the solution was cooled in an ice bath and acidified by addition of conc. HCl. The solution was cooled for 2 hours in a refrigerator and 1.3 grams of a yellow precipitate was filtered off which had a M.P. of 270–272° C. (dec.). The compound obtained is N,N'-diacetyl-N,N'-(2,5-dicarboxy-p-phenylene) diglycine having the structural formula

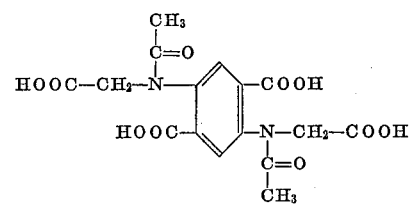

EXAMPLE III

A mixture of 6.9 grams of anhydrous sodium acetate, 23.5 ml. of acetic anhydride, and 4.7 grams of N,N'-diacetyl-N,N' - (2,5-dicarboxy-p-phenylene) diglycine was refluxed for 1 hour, then evaporated under vacuum. The obtained brown residue was dissolved in 20 ml. $H_2O$ by heating, precipitated by cooling, filtered off and washed with water. A 2.1 gram yield of compound was obtained.

The IR-spectrum was consistent with the proposed structure

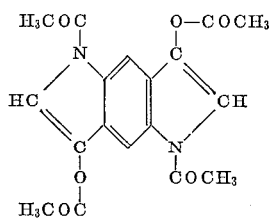

for the compound, N,N'-diacetyl-3,7-diacetoxy-1,5-dihydrobenzo[1,2-b',4,5-b'] dipyrrole.

EXAMPLE IV

A mixture of 56.4 grams of N,N'-(2,5-dicarboxy-p-phenylene) diglycine, 82.8 grams of anhydrous sodium acetate and 282 milliliters of acetic anhydride was refluxed for 2 hours, and then evaporated in vacuo. The residue was heated with water and 20.4 grams of a brown precipitate having a melting point of 230°–235° C. was filtered off. The product was purified by recrystallization and had a melting point of 291°–292° C.

Analysis of the product, N,N'-diacetyl-3,7-diacetoxy-1,5-dihydrobenzo[1,2-b',4,5-b'] dipyrrole, was as follows: Calcd.—C, 60.6; H, 4.53; N, 7.59. Found C, 60.0; H, 4.51; N, 7.51.

EXAMPLE V

Preparation of polymer having the structure

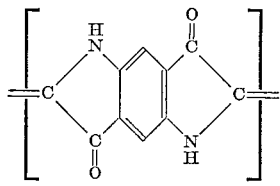

was as follows:

A 30 ml. portion of 4 N NaOH was refluxed for a few minutes under a nitrogen blanket in order to remove oxygen. Then 1.0 gram of the compound prepared in Example III was added to the cooled NaOH solution. Nitrogen was replaced by oxygen, and the solution was stirred in a closed system with the O₂ uptake measured in a 50 ml. buret. In 59 minutes 62.7 ml. O₂ was consumed. Then the brownish-black solution was acidified by 5% HCl. A yield of 0.45 grams of black precipitate was obtained. The polymer, poly 2,6(3,7-dihydroxy-benzo[1,2-b; 4,5-b'] dipyrrole), does not melt upon heating to approximately 600° C., and burns very slowly when placed on a spatula in a Bunsen flame.

EXAMPLE VI

A mixture of 9.36 grams of N,N'-(2,5-dicarboxy-p-phenylene)diglycine, 7.2 grams of NaOH, 5.94 ml. of benzyl chloride and 150 ml. water was stirred for 2 hours at 40° C. The solution was cooled, extracted three times with ether, and acidified by conc. HCl. A yield of 7.7 grams of yellow precipitate was isolated. Upon recrystallization from acetone a M.P. of 249–251° C. was obtained. This compound, N,N'-dibenzyl-N,N'-(2,5-dicarboxy-p-phenylene)diglycine has the structure

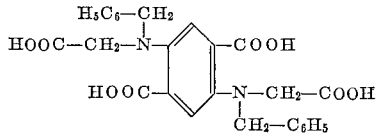

EXAMPLE VII

A mixture of 2.9 grams of N,N'-dibenzyl-N,N'-(2,5-dicarboxy-p-phenylene)diglycine, 2.9 grams of anhydrous sodium acetate and 16.1 ml. of acetic anhydride was refluxed for 2 hours. With gas evolution a brown solution was formed which was evaporated in vacuo, and the residue heated with 15 ml. of water. Upon cooling and purification from diemthylacetamide and water, there was obtained 2.3 grams of a light brown compound, N,N'-dibenzyl-3,7-diacetoxy - 1,5 - dihydrobenzo[1,2-b;4,5-b'] dipyrrole, structural formula

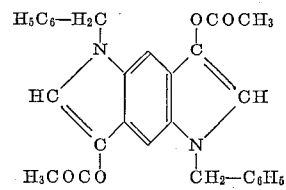

having a M.P. of 222–226° C.

Calcd.—C, 74.4; H, 5.32; N, 6.19. Found: C, 74.5; H, 5.35; N, 5.91.

EXAMPLE VIII

A solution of 19 grams of chloroacetic acid in 50 ml. of water was neutralized with 4 N sodium hydroxide. To this solution was added 10.8 grams of p-phenylene diamine and the mixture refluxed for 3 hours, then kept at 0° C. for 1 additional hour. A 23.3 gram portion of a purple crystalline material was filtered off. An aqueous solution of the compound was adjusted to a pH of 11 with potassium hydroxide and evaporated to dryness. The residual dipotassium salt, dipotassium para-phenylene diglycinate, was dried in vacuo at 100° C.

EXAMPLE IX

A solution of 120 grams of chloroacetic acid in 300 ml. of water was neutralized with 4 N sodium hydroxide, 64.8 grams of m-phenylene diamine was added and the mixture was refluxed for 4 hours. The solution was then partially evaporated, cooled and filtered. A 141 gram yield of product was obtained which had a melting point of 80 to 90° C. The dipotassium salt, dipotassium m-phenylene diglycinate was isolated as in Example VIII.

EXAMPLE X

A solution of 11.5 grams of chloroacetic acid in 30 ml. of water was neutralized with 4 N sodium hydroxide, 7.9 grams of 1,5-naphthalene diamine was added and the mixture was refluxed for 4 hours. A purple product in the amount of 13.8 grams was obtained which had a melting point of 288 to 290° C. The product was converted to the dipotassium salt, dipotassium 1,5-naphthalene-diglycinate as in Example VIII.

EXAMPLE XI

A solution of 23 grams of chloroacetic acid in 50 ml. of water was neutralized with 4 N sodium hydroxide, 18.4 grams of benzidine were added and the mixture was refluxed for 4 hours. After cooling 31.4 grams of a yellowish product was filtered off which had a melting point of 190 to 193° C. A slurry of the material in 200 ml. of water was made basic by the addition of potassium hydroxide and evaporated. The residue, dipotassium 4,4'-biphenyl-diglycinate, was dried in a vacuum oven at 100° C.

EXAMPLE XII

This example presents the preparation of a polymer from dipotassium p-phenylene-diglycinate. A mixture of 15 grams of sodium hydroxide and 20 grams of potassium hydroxide was heated under nitrogen in a stainless steel beaker to about 600° C. for 15 minutes. After cooling to 220° C. 10 grams of sodium amide was added over a 10 minute period. Then 11.8 grams of dipotassium p-phenylene-diglycinate was added in small portions. 15 minutes after addition of the potassium salt the black mixture was allowed to cool. It was then dissolved in 350 ml. of water, air was bubbled into the solution for 2 hours. The solution was neutralized with concentrated hydrochloric acid and 2.6 grams of a black polymeric substance was collected which had a melting point in excess of 450° C. Differential thermal analysis in nitrogen indicated a phase transition for the polymer at about 623° C. Thermogravimetric analysis in nitrogen showed a weight loss of 22% up to 900° C.

EXAMPLE XIII

An 11.8 gram portion of dipotassium m-phenylene-diglycinate was added in small portions under nitrogen to a melt of 15 grams sodium hydroxide, 20 grams of potassium hydroxide, and 10 grams of sodium amide at 220° C. 15 minutes after addition was completed the mixture was allowed to cool, and was then dissolved in 350 ml. of water. The solution was aerated for 20 hours and acidified with concentrated HCl. The yield was 2.4 grams of black polymer, the polymer from dipotassium m-phenylene-diglycinate was obtained which had a melting point in excess of 420° C.

EXAMPLE XIV

A 13.8 gram portion of dipotassium 1,5-naphthalene-diglycinate was added in small portions under nitrogen to a melt of 15 grams of sodium hydroxide, 20 grams of potassium hydroxide and 10 grams of sodium amide at 220° C. 15 minutes after addition was completed, the mixture was allowed to cool and then dissolved in 350 ml. of water. The resulting solution was aerated for 18 hours at room temperature and acidified by concentrated HCl. The yield was 4.1 grams of a black substance having a melting point of 420° C.

EXAMPLE XV

A 14.8 gram portion of dipotassium-4,4'-biphenylene-diglycinate was added in small portions under nitrogen to a melt of 15 grams of sodium hydroxide, 20 grams of potassium hydroxide and 10 grams of sodium amide at 220° C. 15 minutes after the addition was completed, the mixture was allowed to cool and dissolved in 350 ml. of water. The solution was filtered, aerated for 20 hours at room temperature, then acidified by concentrated HCl. 1.6 grams of a black polymeric substance was filtered off which had a melting point in excess of 420° C.

EXAMPLE XVI

A mixture of 1.0 gram of N,N'-dibenzyl-3,7-diacetoxy-1,5-dihydrobenzo[1,2-b;4,5-b']dipyrrole, 15 ml. of 4 N NaOH and 15 ml. of ethanol was heated under nitrogen for ½ hour at 100° C. The ethanol was evaporated, 15 ml. of hexamethylphosphoramide added and the solution stirred in oxygen at 25° C. During 20 minutes, 50 ml. of $O_2$ were absorbed. The mixture was acidified by conc. HCl and 0.88 gram of a black material resulted. Purification from dimethylacetamide containing 5 percent LiCl mixed with water and water alone gave 0.61 gram of black powder which had a melting point in excess of 420° C.

As many widely different embodiments of this invention may be made without departing from the spirit and scope thereof, it is to be understood that the invention is not to be limited by the specific embodiments set forth herein but only by the claims which follow.

I claim:
1. A polymer consisting essentially of the recurring structural unit

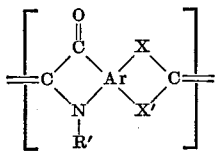

wherein Ar is an aromatic hydrocarbon radical containing from 6 to 18 carbon atoms, R' is selected from the group consisting of hydrogen, lower alkyl, alkaryl, and aryl, X and X' are selected from the group consisting of

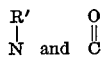

provided that X and X' are different, and wherein the nitrogens and carbonyls bonded to each side of Ar are attached to adjacent substitutable carbon atoms of Ar.

2. A polymer consisting essentially of the recurring structural unit

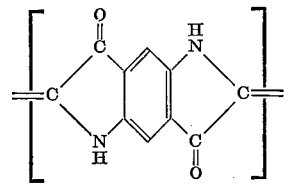

3. A polymer consisting essentially of the recurring structural unit

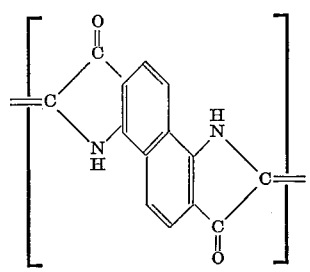

4. A polymer consisting essentially of the recurring structural unit

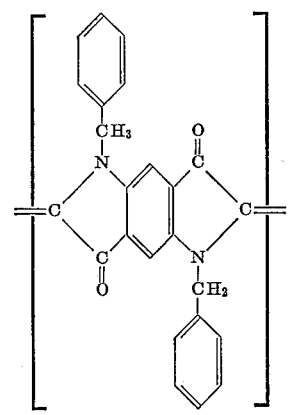

5. A polymer consisting essentially of the recurring structural unit

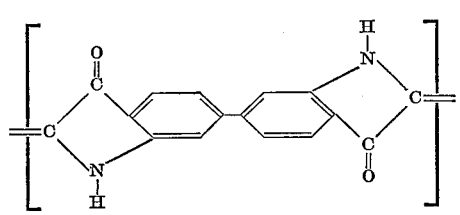

6. A polymer consisting essentially of the recurring structural unit

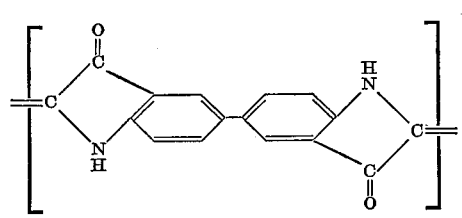

7. A process for the preparation of polymers consisting essentially of the recurring structural unit

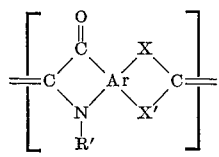

wherein R' is selected from the group consisting of hydrogen, lower alkyl, alkaryl, and aryl, X and X' are selected from the group consisting of

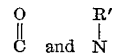

provided that X and X' are different, Ar is an aromatic hydrocarbon radical of 6 to 18 carbon atoms and wherein the nitrogens and carbonyls bonded to each side of Ar are attached to adjacent substitutable carbon atoms of Ar comprising the steps of:
(1) contacting an intermediate monomer of the formula

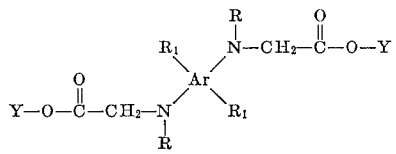

wherein Ar is an aromatic hydrocarbon radical containing from 6 to 18 carbon atoms, R is selected from the group consisting of hydrogen, lower alkyl, alkaryl, acyl, and aryl, $R_1$ is selected from the group consisting of hydrogen and carboxyl, and Y is selected from the group consisting of hydrogen and carboxylic acid salt forming elements, with a ring closure medium to form an oxidizable monomer of the formula

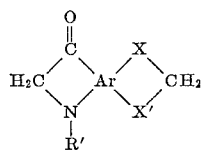

wherein Ar, X and X' are the same as above, and R' is selected from the group consisting of hydrogen, lower alkyl, alkaryl and aryl,
(2) and oxidizing the oxidizable monomer to produce the polymers of the invention.

8. The process of claim 7 wherein the oxidizing is by means of molecular oxygen in a basic medium.

9. A process for the preparation of polymers consisting of the recurring structural unit

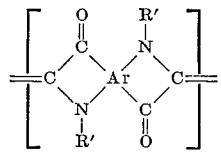

wherein R' is selected from the group consisting of hydrogen, lower alkyl, alkaryl, and aryl, Ar is an aromatic hydrocarbon radical of 6 to 18 carbon atoms and wherein the nitrogens and carbonyls bonded to each side of Ar are attached to adjacent substitutable carbon atoms of Ar, comprising the steps of:
(1) contacting an intermediate monomer of the formula

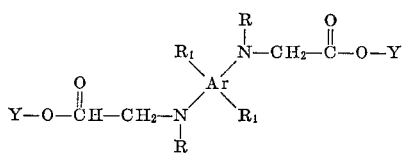

wherein Ar is an aromatic hydrocarbon radical containing from 6 to 8 carbon atoms, R is selected from the group consisting of hydrogen, lower alkyl, alkaryl, acyl and aryl, $R_1$ is selected from the group consisting of hydrogen and carboxyl and Y is selected from the group consisting of hydrogen and carboxylic acid salt-forming elements, with a ring closure medium to form an oxidizable monomer of the formula

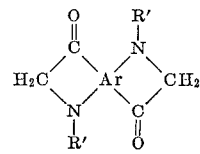

wherein Ar is an aromatic hydrocarbon radical containing from 6 to 18 carbon atoms, R' is selected from the group consisting of hydrogen, lower alkaryl, alkyl, and aryl, and wherein the nitrogens and carbonyls bonded to each side of Ar are attached to adjacent substitutable carbon atoms of Ar;
(2) and oxidizing the oxidizable monomer to produce the polymers of the invention.

10. The process of claim 8 wherein the oxidizing is by means of molecular oxygen in a basic medium.

References Cited

UNITED STATES PATENTS

| 2,502,548 | 4/1950 | Allen et al. |
| 2,895,948 | 7/1959 | Brinker et al. |
| 3,174,947 | 3/1965 | Marvel et al. |
| 3,267,081 | 8/1966 | Rudner et al. |

WILLIAM H. SHORT, *Primary Examiner.*

H. D. ANDERSON, *Assistant Examiner.*